March 21, 1933.  F. KRUCKENBERG ET AL  1,902,783

SIDE WIND PROTECTION FOR RAILWAY SYSTEMS

Filed Sept. 4, 1930  2 Sheets-Sheet 1

Inventors:
Franz Kruckenberg,
Curt Stedefeld,
by Byrnes, Townsend & Potter,
Attorneys.

March 21, 1933.   F. KRUCKENBERG ET AL   1,902,783
SIDE WIND PROTECTION FOR RAILWAY SYSTEMS
Filed Sept. 4, 1930   2 Sheets-Sheet 2

Patented Mar. 21, 1933

1,902,783

UNITED STATES PATENT OFFICE

FRANZ KRUCKENBERG AND CURT STEDEFELD, OF HANOVER, GERMANY

SIDE WIND PROTECTION FOR RAILWAY SYSTEMS

Application filed September 4, 1930, Serial No. 479,762, and in Germany October 25, 1929.

The present invention relates to side wind protection for railway systems and particularly to a method and apparatus for protecting the railway vehicle of the high speed type, from side wind pressures.

The principal object of the invention is the reduction of side wind pressures in high speed railway vehicles with the consequent reduction in resultant relative air speed of the vehicle.

Figure 1:
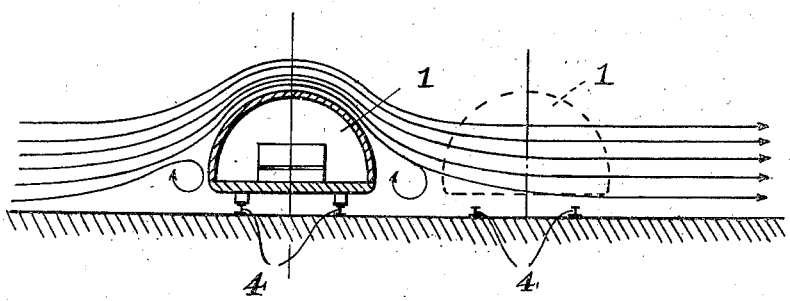
Figure 2:
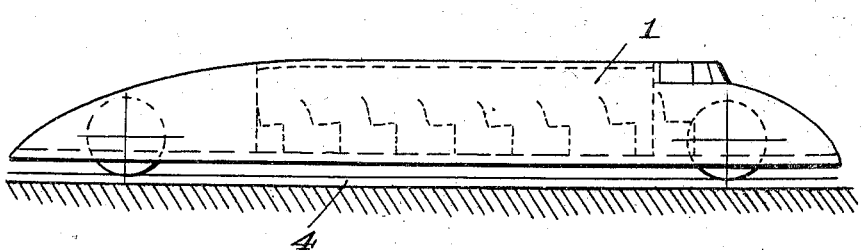

A description of the invention is set forth below, in which reference is made to the accompanying drawings, wherein Figs. 1 and 2 show transverse sectional and side elevational views respectively, of a vehicle having a theoretically ideal stream-line shape.

Figure 3:
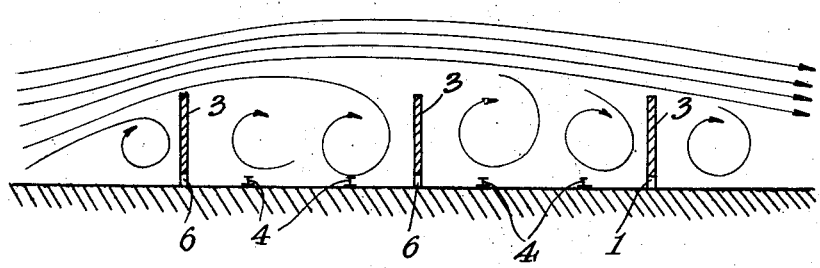
Figure 4:
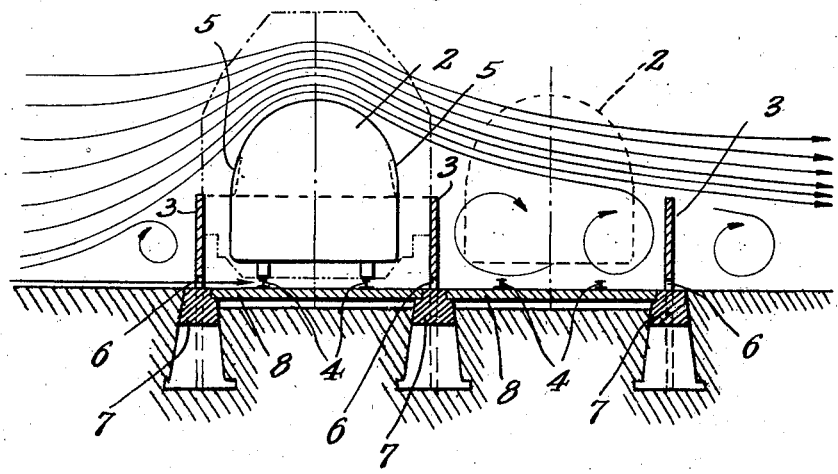

Fig. 3 is a transverse sectional view, showing the road bed and protecting walls according to the invention, and Fig. 4 is a similar view, showing a modified form of road bed and protecting walls with a vehicle shown in its normal relation to the road bed.

It is to be expected that with a carefully laid track with high speed driven cars which are sufficiently low in air resistance and weight far higher speeds could be employed than normally reached hitherto by railway vehicles. Already in 1903 an electric driven car on the Marienfelde-Zossen railway reached a maximum speed of 214 km. per hour. The relative air speed in the line of travel is here about 60 metres per sec. If there is a storm wind of say 20 metres per sec. perpendicular to the line the relative air speed in the line of travel and the wind combine to form a resultant of higher speed than that of the relative air speed in the line of travel, and the resultant is not in the line of travel but is at about 20° thereto. A lateral pressure is produced which increases with the height of the vehicle and the more closely its cross section approaches a rectangle with flat sides. Accordingly, the most suitable form of the vehicle would be a beetle shape. A vehicle of this form is shown in Figures 1 and 2 of the accompanying drawings. Such a vehicle could, however, only allow limited head room for the passengers which in uninterrupted, long journeys would be highly disadvantageous.

The object of the invention is to provide the same or similarly efficient wind passage while raising the clear space in the vehicle to standing height, a vehicle 2 of this form being shown in Figure 4. For this purpose protecting walls or fences 3 are provided parallel to the tracks 4 as close as possible to the vehicles 2, in normal railings in the boundary of the loading gauge, and of such height that their upper edges are level with the lower edges of the windows 5 of the cars. The lateral winds are directed by these walls 3 as shown in Figure 3. Figure 4 shows that with such longitudinal walls the vehicle cross section can be extended to a rectangular form at the bottom, without the vehicle being more undesirably affected by side winds than in Figure 1. The walls or fences 3 must not reach the ground, but be provided with openings 6 to permit air to pass with such speed as will prevent accumulation of snow.

Figure 4 also shows that the walls or fences 3 can be erected on continuous foundations 7 which also serve to carry raised elastic sleepers 8.

We claim:

1. In a railway the combination of a track, imperforate wind protection walls parallel with said track in the outer boundaries of the loading gauge, and a car having portion projecting above said walls said portion being rounded off, the upper edges of said walls being substantially level with the lower edges of the car windows.

2. In a railway the combination of a track, imperforate, vertical wind protection walls extending parallel with said track and located in the outer boundaries of the loading gauge and having their lower edges at such a height from the ground as to pass sufficient side wind to prevent the accumulation of snow behind said walls, and a car having that part projecting above said walls rounded off.

3. In a railway the combination of a track, wind protection walls parallel with said track located in the outer boundaries of the loading gauge and having their lower edges at such a height from the ground as to pass sufficient side wind to prevent the accumulation of snow behind said walls, and a car having that part projecting above said walls rounded off, the upper edges of said walls being substantially level with the lower edges of the car windows.

4. In a railway the combination of continuous foundations and wind protection walls erected on said foundations.

5. In a railway the combination of continuous foundations, wind protection walls erected on said foundations and raised elastic sleepers mounted on said foundations.

6. In a railway the combination of a track, a car, windows in said car, and an imperforate wind protection wall on one side of and parallel to said track extending up to the lowest edges of said windows.

7. In a railway the combination of a track, a car having a rounded top, and an imperforate wind protection wall on one side of and parallel with said track extending substantially up to the lowest part of said rounded top.

In testimony whereof, we affix our signatures.

FRANZ KRUCKENBERG.
CURT STEDEFELD.